United States Patent
Prechner et al.

(10) Patent No.: US 9,398,412 B2
(45) Date of Patent: Jul. 19, 2016

(54) INDOOR POSITION LOCATION USING DOCKED MOBILE DEVICES

(71) Applicant: Intel Corporation, Santa Clara, CA (US)

(72) Inventors: Gaby Prechner, Rishon Lezion (IL); Leor Banin, Petach Tikva (IL); Yuval Amizur, Kfar-Saba (IL)

(73) Assignee: INTEL CORPORATION, Santa Clara, CA (US)

( * ) Notice: Subject to any disclaimer, the term of this patent is extended or adjusted under 35 U.S.C. 154(b) by 48 days.

(21) Appl. No.: 14/038,718

(22) Filed: Sep. 26, 2013

(65) Prior Publication Data

US 2015/0087330 A1 Mar. 26, 2015

(51) Int. Cl.
*H04W 64/00* (2009.01)
*H04W 4/02* (2009.01)
*G01S 5/14* (2006.01)

(52) U.S. Cl.
CPC . *H04W 4/023* (2013.01); *G01S 5/14* (2013.01)

(58) Field of Classification Search
CPC ........ H04W 4/043; H04W 64/00; G01S 5/14; G01S 5/021; G01S 19/44–19/46; G01S 19/14
USPC ............................. 455/513; 342/387; 370/338
See application file for complete search history.

(56) References Cited

U.S. PATENT DOCUMENTS

| | | | |
|---|---|---|---|
| 7,962,162 B2* | 6/2011 | McNair ........................ | 455/503 |
| 2001/0053699 A1* | 12/2001 | McCrady et al. ............. | 455/513 |
| 2004/0087317 A1* | 5/2004 | Caci ........................... | 455/456.1 |
| 2004/0225438 A1* | 11/2004 | Draganov .................... | 701/213 |
| 2004/0263348 A1* | 12/2004 | Watson ....................... | 340/825.49 |
| 2005/0002481 A1* | 1/2005 | Woo et al. .................... | 375/354 |
| 2006/0209930 A9* | 9/2006 | Gilmour et al. ............... | 375/148 |
| 2007/0247366 A1* | 10/2007 | Smith et al. ................... | 342/464 |
| 2012/0010812 A1* | 1/2012 | Thompson ............. | G01C 21/16 701/501 |
| 2012/0172054 A1* | 7/2012 | Waters et al. ............... | 455/456.1 |
| 2012/0236835 A1* | 9/2012 | Rokusek et al. .............. | 370/338 |
| 2013/0017840 A1* | 1/2013 | Moeglein et al. .......... | 455/456.1 |

* cited by examiner

*Primary Examiner* — William Nealon

(57) ABSTRACT

Examples are disclosed for a mobile device to determine its location by trilateration with docked mobile devices and, optionally, wireless access points. Locations are determined to within an accuracy of within three feet. The docked mobile devices are at fixed locations such as docked to a docking station. In some examples, a mobile device may perform ranging to the docked mobile devices and fixed wireless stations. Ranging may use a time-of-flight (ToF) process, and may compensate for multipath interference. Trilateration may consider relative accuracies of ranging components. Other examples are described and claimed.

22 Claims, 9 Drawing Sheets

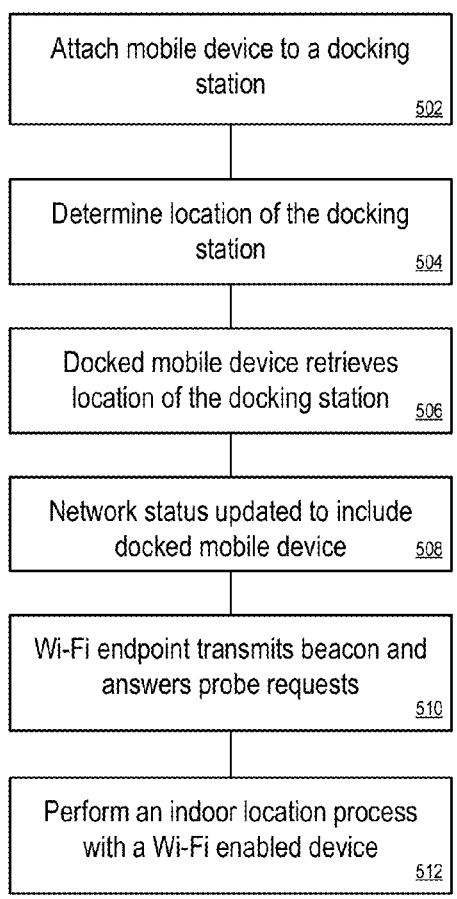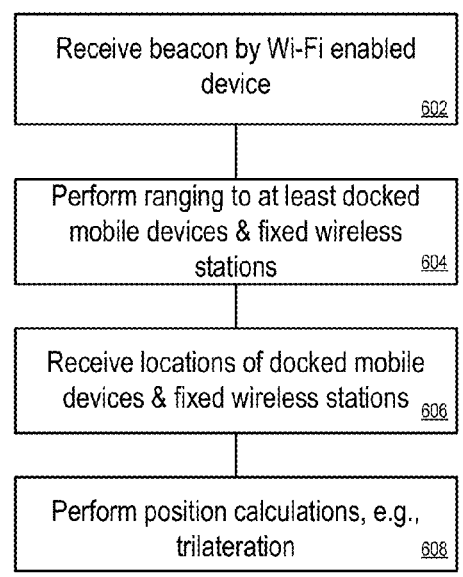

INDOOR POSITION LOCATION USING DOCKED MOBILE DEVICES

TECHNICAL FIELD

Examples described herein are generally related to assisted indoor spatial position determination.

BACKGROUND

Highly accurate outdoor position location determination and outdoor navigation is widely available through use of various global navigation satellite systems ("GNSS"), such as GPS, GLONASS, BEIDOU or GALILEO. Position location of a terminal is derived from a solution of state equations based upon radio signals received from multiple satellites of one of the satellite systems. Accuracy within a few tens of feet is achievable with commercial-grade satellite signals. In contrast, satellite navigation is generally not possible in an indoor environment because the satellite signals are attenuated by the structure. Except in limited circumstances such as near a window, the received satellite signal strength level is below a threshold level needed by a satellite signal receiver. Therefore, a need exists to provide highly accurate indoor position location determination and indoor navigation, without the need for additional fixed access points.

BRIEF DESCRIPTION OF THE DRAWINGS

FIG. 5 illustrates an example of a first process.
FIG. 6 illustrates an example of a second process.

DETAILED DESCRIPTION

Figure 1:
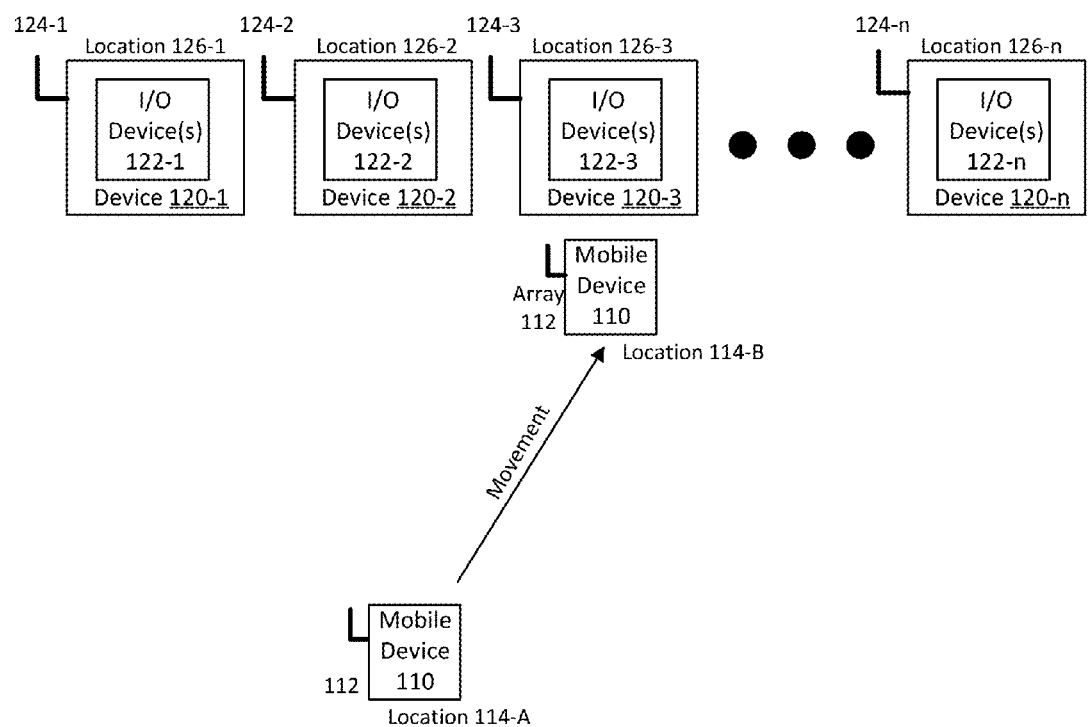
FIG. 1 illustrates an example of a system.

Position location determination in an indoor environment often requires communicating with pre-positioned fixed access points ("APs") to receive special signals used for a ranging process such as Time-of-Flight ("ToF") and a process for determining locations such as trilateration or received signal strength indication ("RSSI") measurements. RSSI-based methods by the terminal whose position is being determined are based on measurements of the received signal strength from multiple APs that are near the terminal. Two approaches are used for RSSI-based methods. First, a geometric approach makes use of a model that connects the RSSI with the range. The location is then calculated by trilateration, e.g., a process of determining absolute or relative locations of points by measurement of distances, using the geometry of circles, spheres or triangles. Unlike triangulation, which uses angle measurements (together with at least one known distance) to calculate the subject's location, trilateration uses the known locations of two or more reference points (anchors), and the measured distance between the subject and each reference point. To locate a node in two dimensions, three anchors are required; three dimensions require four anchors.

Second, a fingerprint approach compares RSSI measurements from an unknown or uncertain position to a pre-mapped pattern or set of RSSI measurements to locations. The location is then deemed to be the location associated with the pre-mapped pattern of RSSI measurements that provides the closest match to the RSSI measurements.

Some approaches for improving coverage or positional accuracy require deployment of more fixed access points and/or placing them closer together. However, additional fixed access points represent an additional expense, and fixed access points take time to install in an indoor environment. Furthermore, the additional fixed access points must share the indoor spectrum with each other and other wireless communication devices. Therefore, a need exists to provide highly accurate indoor position location determination and indoor navigation, without the need for additional fixed access points.

The indoor radio environment is often dominated by computing devices having wireless capabilities that communicatively couple to other such devices having wireless capabilities and/or to an access point of a wireless local area network ("WLAN") using wireless technologies such as the Institute of Electrical and Electronic Engineers (IEEE) 802.11 WLAN family of specifications (e.g., sometimes referred to as "Wi-Fi®"). Also, wireless technologies designed to operate in a 60 GHz communication band, such as IEEE 802.11ad (e.g., sometimes referred to as "WiGig®") may allow wireless capable devices to replace wired interconnects with high speed and relatively short range wireless interconnects via a process typically referred to as wireless docking. The high speed and relatively short range wireless interconnects using wireless technologies such as WiGig may allow wireless devices to wirelessly dock with devices having one or more input/output devices such as a display, a keyboard, a network interface card, a mouse or a storage device. In some examples, once wirelessly docked, the wireless device may utilize the one or more input/output devices in a same manner as when connected to a wired or physical docking station.

Examples are generally directed to improvements for wireless and/or mobile devices to determine their position location by wirelessly communicating with other wireless terminals that are at known locations. The wireless technologies are associated with Wi-Fi or WiGig. These wireless technologies may include establishing and/or maintaining wireless communication links through various frequency bands to include Wi-Fi and/or WiGig frequency bands, e.g., 2.4, 5 or 60 GHz. These wireless technologies may also include wireless technologies suitable for use with mobile devices or user equipment (UE) capable of coupling to other devices via a WLAN or via a peer-to-peer (P2P) wireless connection. For example, mobile devices and the other device may be configured to operate in compliance with various standards promulgated by the Institute of Electrical and Electronic Engineers (IEEE). These standards may include Ethernet wireless standards (including progenies and variants) associated with the IEEE Standard for Information technology—Telecommunications and information exchange between systems—Local and metropolitan area networks—Specific requirements Part 11: WLAN Media Access Controller (MAC) and Physical Layer (PHY) Specifications, published March 2012, and/or later versions of this standard ("IEEE 802.11 Standard").

In some examples various IEEE standards associated with the IEEE 802.11 Standard such as IEEE 802.11a/b/g/n, IEEE 802.11ac or IEEE 802.11ad may be utilized by mobile devices or other devices to establish or maintain WLAN and/or P2P communication links and/or establish wireless communications with each other (e.g., wireless accessing).

These other devices may have one or more input/output devices to possibly be used by mobile devices upon wirelessly access. The other devices may include wireless access capabilities and may include, but are not limited to, a docking device, a smart phone, a smart television, smart audio speakers, a notebook computer, a tablet computer, a netbook computer, other small computing devices (e.g., Ultrabook™ device—Ultrabook is a trademark of Intel Corporation in the U.S. and/or other countries), desktop computer, a workstation computer, a server, a handheld gaming device, a gaming console, a handheld media player or a media player console. The one or more input/output devices may either be integrated with the other devices or may be coupled via one or more wired and/or wireless connections.

According to some examples, an indication may be received at a mobile device to identify a given device to wirelessly access via a Wi-Fi or WiGig frequency bands. For these examples, distances between the mobile device and one or more devices capable of wirelessly accessing the mobile device may be determined utilizing the Wi-Fi or WiGig frequency bands. The given device may then be identified from among the one or more devices based on the given device having the shortest determined distance. In some examples, using the Wi-Fi or WiGig frequency bands to both identify the given wireless device and to wirelessly access may enable the wireless device to efficiently wirelessly access the given device without utilizing additional wireless technologies such as near-field communication ("NFC").

FIG. 1 illustrates an example system 100. In some examples, as shown in FIG. 1, system 100 includes a mobile device 110 a plurality of devices 120-1 to 120-n, where n equals any positive whole integer greater than or equal to 3. Also as shown in FIG. 1, mobile device 110 includes an antenna 112 that may include one or more antennas elements capable of transmitting or receiving communication signals via a Wi-Fi or WiGig frequency band. Also, in some examples, devices 120-1 to 120-n may include antennas 124-1 to 124-n, respectively as shown in FIG. 1. Antennas 124-1 to 124-n may separately include one or more antenna elements capable of transmitting or receiving communication signals via a Wi-Fi or WiGig frequency band. Devices 120-1 to 120-n may also separately include one or more input/output (I/O) devices 122-1 to 122-n, respectively, as shown in FIG. 1. These I/O devices may include, but are not limited to a display, a keyboard, a mouse, and a storage device, a network interface card connected to the internet or one or more audio speakers. Devices 120-1 to 120-n may functionally operate as an access point for Wi-Fi or WiGig communications.

In some examples, mobile device 110 and devices 120-1 to 120-n may be arranged to operate according to the one or more wireless network technologies associated with IEEE 802.11 such as IEEE 802.11ad and/or WiGig. Although not shown in FIG. 1, mobile device 110 and devices 120-1 to 120-n may each include logic and/or features (e.g., chipsets, processor circuits, memory, protocol stacks, etc.) to operate according to IEEE 802.11ad and/or WiGig to transmit or receive communication signals via a Wi-Fi or WiGig frequency band used as described in the IEEE 802.11ad standard.

According to some examples, mobile device 110 may include logic and/or features to receive an indication to identify a given device from among devices 120-1 to 120-n to wirelessly access via the Wi-Fi or WiGig frequency band. For these examples, the indication may be received at location 114-A. The indication may be received based on a user of mobile device 110 coming within a physical proximity of devices 120-1 to 120-n. Either the user manually causes the indication or mobile device 110 may be capable of automatically initiating the indication based on coming within range of the Wi-Fi or WiGig frequency band transmitted from one or more of devices 120-1 to 120-n. This disclosure is not limited to these methods of indication.

In some examples, based on receiving the indication, the logic and/or features of mobile device 110 may gather identification information from devices 120-1 to 120-n. For these examples, the information may be gathered from those devices from among devices 120-1 to 120-n that may be capable of wirelessly accessing to mobile device 110. This capability may be based on whether a given device is available for wireless accessing (not being used by another mobile device) or is within close enough range of mobile device 110 to establish a wireless access with mobile device 110.

According to some examples, responsive to an identification request message from mobile device 110, one or more devices from among devices 120-1 to 120-n may transmit identification information to mobile device 110. Logic and/or features at mobile device 110 may then gather this received identification information. The identification information may include, for example, separate media access control (MAC) addresses for the one or more devices that responded to the identification request message.

In some examples, logic and/or features of mobile device 110 may be capable of determining distance(s) to the one or more devices from among devices 120-1 to 120-n that responded to the identification request. For these examples and as described more below, a ranging technique utilizing the Wi-Fi or WiGig frequency bands may be used to determine distances between mobile device 110 and the one or more devices. For example, distances may be determined at either location 114-A or, following movement, at location 114-B as shown in FIG. 1.

According to some examples, logic and/or features of mobile device 110 may be capable of identifying the given device from among devices 120-1 to 120-n that has the shortest determined distance. For some examples, this identification may occur following a determination that mobile device 110 has stopped moving and thus may have been located at or near the given device by the user of mobile device 110. For example, as shown in FIG. 1, mobile device 110 is closest to device 120-3 at location 114-B. For these examples, the logic and/or features may cause an indication request to be transmitted to device 120-3 to cause the device 120-3 to provide an indication for a selection of device 120-3 for wirelessly accessing to mobile device 110. The indication may include a visual indication such as a glowing display or glowing lights on a keyboard, mouse or other type of I/O device included in I/O devices 122-3.

In some examples, the user of mobile device 110 may either confirm or reject device 120-3. Based on a confirmation, logic and/or features at mobile device 110 may be capable of at least initiating the process to wirelessly access device 120-3. If rejected, the device having a second shortest determined distance (if one exists) may be identified and the same process may be implemented as mentioned above to allow the user to either confirm or reject this second closest device.

According to some examples, devices 120-1 to 120-n may include logic and/or features to facilitate the exchange of information with mobile device 110 to wirelessly access. For example, the logic and/or features may be capable of receiving identification requests and cause identification information to be transmitted to mobile device 110 in response to the identification request.

In some examples, as described more below, logic and/or features of devices 120-1 to 120-n may also be capable of exchanging information to enable mobile device 110 to determine distances via use of the Wi-Fi or WiGig frequency bands. Also, the logic and/or features at these devices may be capable of providing an indication for enabling a selection of a device from among devices 120-1 to 120-n for wireless accessing to mobile device 110. According to some examples, based on selection of the device (e.g., by the user), the logic and/or features at these devices may also be capable of at least initiating the process to wirelessly access mobile device 110.

The problem of indoor location in general is an extremely difficult challenge because the accuracy expected is very high (typically <3 m) and the indoor RF environment suffers from multipath interference. Places where a solution is often sought for the problem of indoor location usually already include a Wi-Fi system deployed for communication purposes. Therefore, previous solutions to indoor location have often involved Wi-Fi signals.

Previous systems to provide indoor location information have attempted to solve the problem of indoor location by denser deployment of access points ("APs"), even if the extra APs were not needed for the purpose of providing communication coverage. Drawbacks of deploying extra APs include that the solution is expensive, the solution is not scalable, and the solution does not integrate well for locations that already have a deployed Wi-Fi network.

In contrast, embodiments in accordance with the present disclosure use a deployed Wi-Fi network by adding additional functionality to access points and endpoints that are already available in the area of interest. The idea is applicable for small computing devices and tablet computing devices (sometimes referred to as UL), but can be extended to other mobile devices.

Embodiments described herein provide highly accurate indoor position location determination and indoor navigation by use of radio navigation. In particular, embodiments are based upon a Time-of-Flight ("ToF") ranging process, also known as round trip time measurement ("RTT"). Time-of-Flight is defined as the overall time a signal propagates from the user to an AP and back to the user. This value can be converted into distance by dividing the time by two and multiplying it by the speed of light. This method is very robust and scalable but requires hardware changes to the Wi-Fi modem.

The Time-of-Flight ("ToF") ranging process employs a geometrical approach to calculate position using trilateration. Unlike the conventional art, which uses RSSI measurements in trilateration calculations, embodiments use round-trip signal propagation times for trilateration calculations. The round-trip signal propagation time provides the range between the transmitter and receiver. In particular, range is calculated by measuring the ToF (e.g., round-trip delay) between each AP and the mobile device whose position is being determined. Although range may be determined by use of a one-directional measurement technique such as Time Differential of Arrival ("TDoA"), such techniques are much more complicated to handle due to a higher level of required synchronization, and due to having to process the information from all nodes in a single node.

The ToF in each direction is calculated using the difference between the time of departure ("ToD") and time of arrival ("ToA") for the respective direction. A round-trip calculation eliminates the effect of clock skew between the mobile device and each AP, and thus eliminates the need for highly synchronized and expensive clocks, because any skew will be additive in one direction but subtractive in the opposite direction. Embodiments assume that clock drift between the round-trip legs is negligible, and that both legs take the same path (e.g., does not have one leg as a direct path and the other leg as a reflected path).

Embodiments may improve the accuracy of the calculated result by using angle-of-arrival information ("AoA"). Knowing the AoA gives more information to calculate position of the device. For example, knowing the AoA from or to APs or stations, along with the device orientation and antenna structure, enables calculation of the position of the device.

If the location of an AP is not accurately known, a crowd-sourcing process may be used to determine the AP's position, using other APs or stations as the crowd.

The ToF process is based upon the Timing Offset Measurement ("TOM") process described in IEEE 802.11v titled "Wireless Network Management." The TOM process uses ToD and ToA measurements to synchronize the clocks of two stations. The ToD and ToA measurements used for TOM may be used for measuring ToF.

Figure 2:
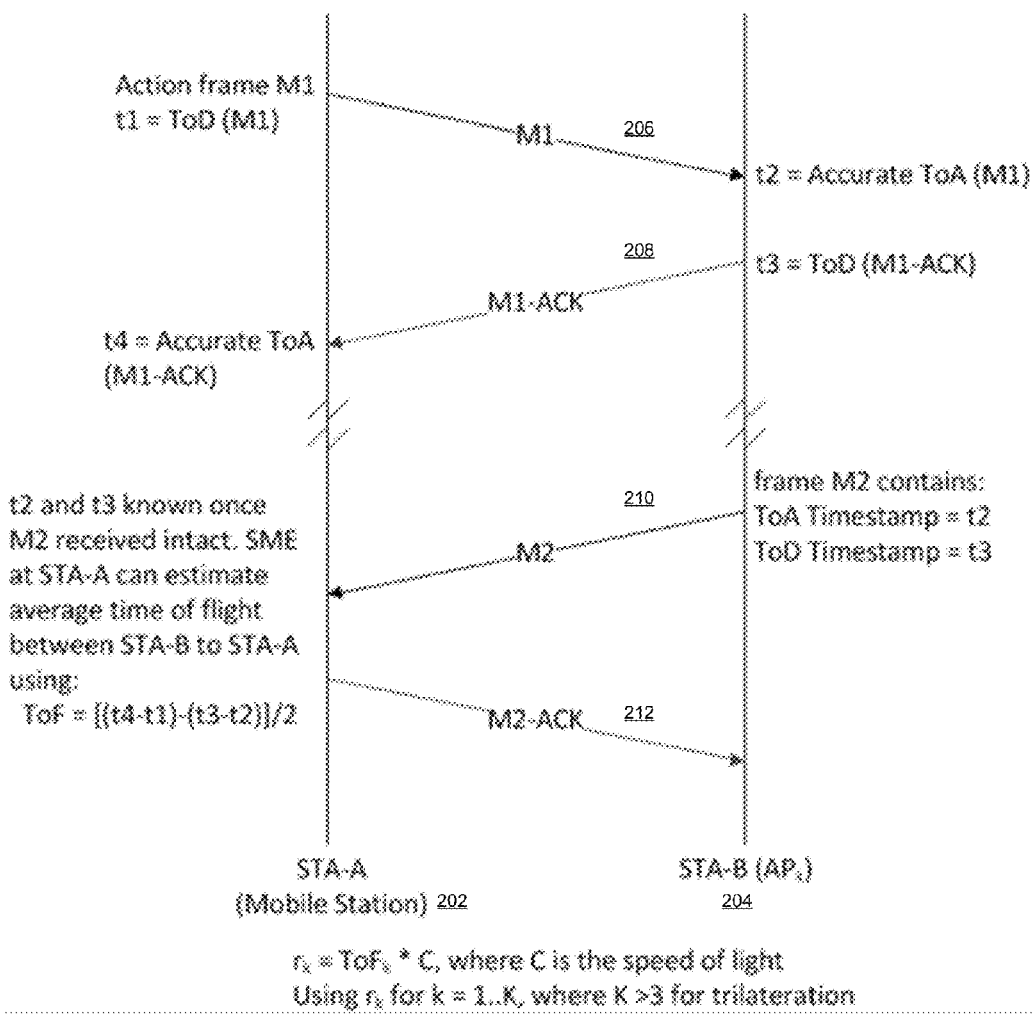
FIG. 2 illustrates an example ranging technique.

FIG. 2 illustrates a message exchange process 200 for ToF measurements between a mobile station 202 and an access point 204. Process 200 begins when mobile station 202 sends message 206 to access point 204. The sending of message 206 is synchronized with an action frame, and a measurement of the time of departure ("ToD") t1 of message 206 is saved by mobile station 202. When access point 204 receives message 206, the time of arrival ("ToA") t2 of message 206 is measured and saved by access point 204.

Next, access point 204 sends acknowledgment message 208 to mobile station 202. The ToD at which access point 204 had sent message 208 is stored by access point 204. When mobile station 202 receives message 208, the time of arrival ("ToA") t4 of message 208 is measured and saved by the mobile station 202.

Next, access point 204 sends message 210 to mobile station 202. Message 210 includes a calculation of t3−t2, e.g., the amount of time that access point 204 spent between receiving message 206 and transmitting message 208. When mobile station 202 receives message 210, mobile station 202 is able to calculate the ToF to the i-th access point as: $ToF_i = ((t4-t1)-(t3-t2))/2$. Optionally, mobile station 202 may send an acknowledgment message 212 to access point 204.

Mobile station 202 will repeat process 200 with at least two more access points in addition to access point 204. After mobile station 202 has performed process 200 with at least three access points, mobile station 202 may then calculate ranges to each of the at least three access points used. Range to the i-th access point 204 is calculated as $ToF_i *C$, wherein "C" is the speed of light. When each of the at least three ranges are determined, a trilateration process may be used to determine the location of mobile station 202. In some embodiments, the trilateration process may be carried out by mobile station 202. In other embodiments, the values of the at least three ranges is communicated to a remote processor such as a network processor for execution of the trilateration process, and a result of the trilateration process may be communicated back to the mobile station.

For indoor position location, it is desirable to have an accuracy of about 1-3 feet. Since the speed of light is approximately one foot per nanosecond (ns), a ToF accuracy of about 1-3 ns is needed. The accuracy of process 200 is affected by uncertainty in the measurement of pulse rise time as a signal is received, which may be caused by interference from multipath signals. Receiver channel bandwidth limitations, jitter and clock accuracy in mobile station 202 and access point 204 may also cause ToF measurement uncertainty. The achievable accuracy typically is unable to support a ToF accuracy of about 1-3 ns. Therefore, an estimation process is used to refine the ToF measurements from process 200.

Figure 3:
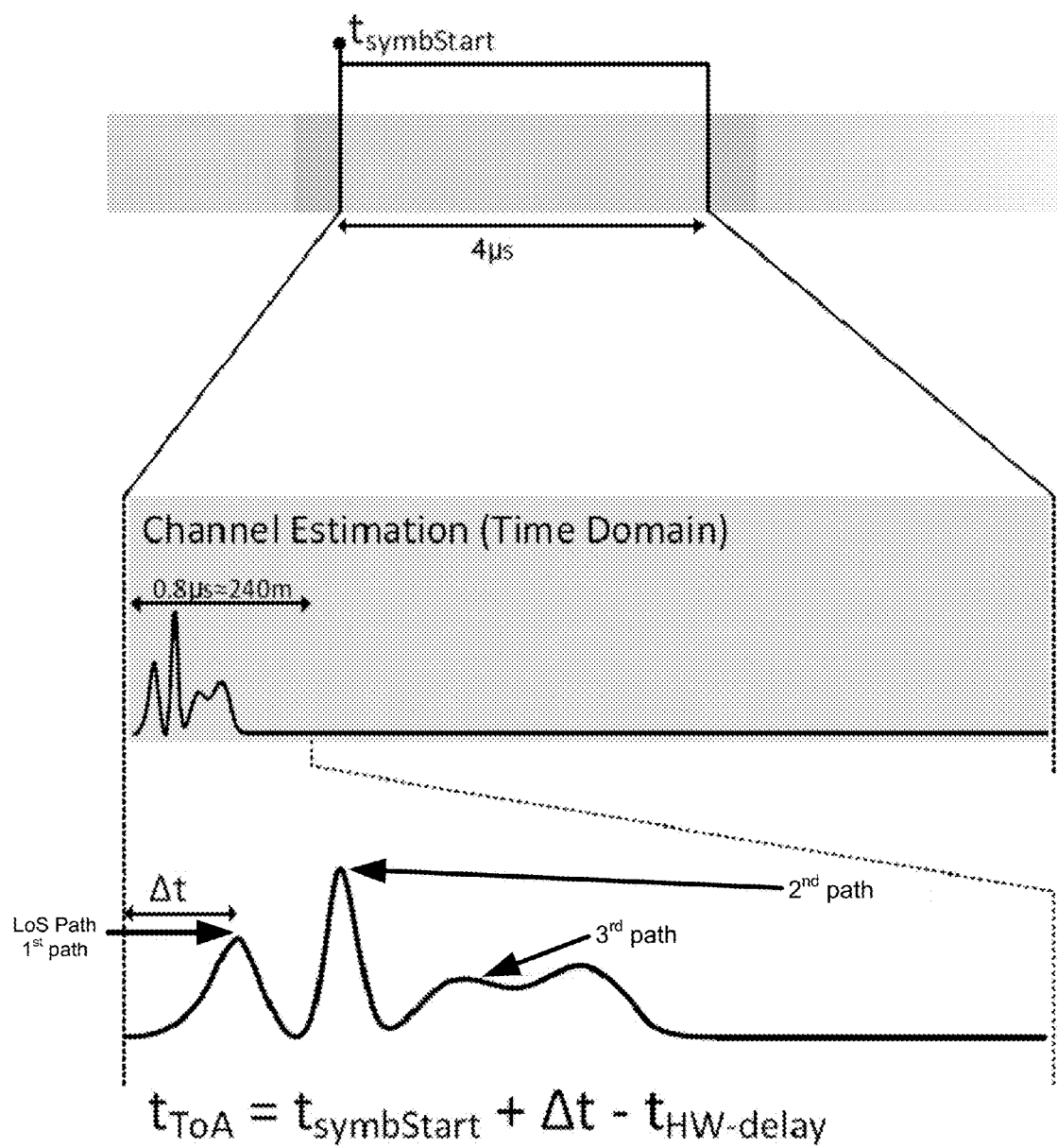
FIG. 3 illustrates an example of a received signal.

One channel estimation process for refining the ToF measurement is illustrated in FIG. 3 as process 300. Process 300 begins by measuring $t_{symbStart}$ from a hardware timer. A high resolution time measurement of the received signal strength may then be measured. Typically the received signal is received as a direct ray (e.g., a line-of-sight ("LoS") ray) and one or more reflected rays. The reflected rays take longer to arrive, and constructive and destructive interference with the direct ray cause signal fluctuations. The first peak of the received signal may be deemed to correspond to the LoS ray, from which the direct path time of arrival and range may be calculated.

Figure 4:
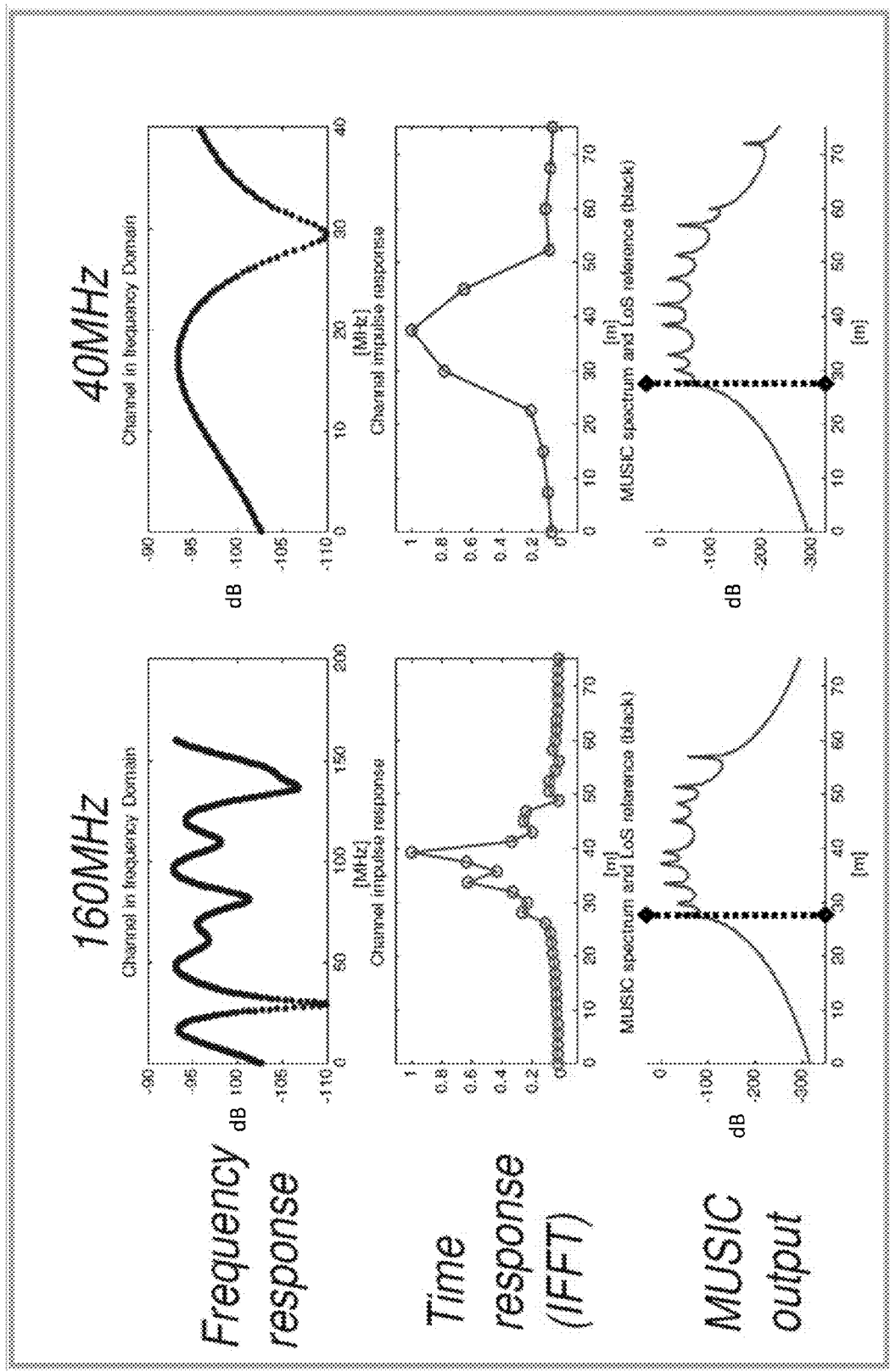
FIG. 4 illustrates an example of a process.

Another channel estimation process for refining the ToF measurement is illustrated in FIG. 4 as process 400. Process 400 uses a multiple signal classification ("MUSIC") process. MUSIC is a super resolution process that can be used to find the different multi-path contribution in higher resolution than the sampling rate. MUSIC estimates the ToA content of a signal or autocorrelation matrix using an eigenspace method. Many variations of the MUSIC process are known.

In FIG. 4, a specific channel realization of the MUSIC process is presented over two different bandwidths, e.g., a wide bandwidth of 160 MHz and a relatively narrower bandwidth of 40 MHz. As in FIG. 3, a first peak in the time response (middle row) corresponds to a Line of Sight ("LoS") contribution, and subsequent peaks in the time response corresponds to reflected rays. The LoS contribution is very weak in the 160 MHz bandwidth time response. In the 40 MHz bandwidth time response the LoS contribution is not visually discernable from the unprocessed data (due to the lower resolution). However, as illustrated in the bottom row, even in the 40 MHz case the MUSIC process is able to detect the weak LoS contribution.

As used herein in the description of the various embodiments, a "wireless station" may be may be any device having Wi-Fi capabilities, including fixed wireless stations and mobile devices. An example of a mobile device may include a wireless station. Fixed wireless stations may include an access point or (in most cases) a conventional desktop or tower PC. Mobile devices may include devices that are capable of being moved a significant distance, relative to a desired positional accuracy, while communicating wirelessly. Mobile devices may include devices such as a laptop, notebook, netbook, tablet, smartphone, small computing devices, gaming device, etc. Mobile devices may be able to couple to a docking station in order to recharge the mobile device, to provide enhanced I/O communication (e.g., an external display, additional USB ports, an external full-size keyboard) and so forth. A mobile device that is coupled to a docking station is referred to herein as a docked mobile device. A mobile device that is not coupled to a docking station is referred to herein as an undocked mobile device.

A docked mobile device will be in a relatively fixed and known location. For example, the docked mobile device may be coupled to a relatively fixed-location docking station, e.g., physically coupled to the docking station or coupled in a way that permits a small amount of movement relative to the desired positional accuracy (e.g., docking through a cable, NFC communication, etc.). The docked mobile device may use a network interface card ("NIC") to communicate with an access point. A Wi-Fi enabled device may be an undocked mobile device whose current location is not accurately known, and whose position is sought.

Embodiments in accordance with the present disclosure recognize that substantially every enterprise or public place has numerous Wi-Fi enabled devices, such as laptops, PCs, notebooks, netbooks, small computing devices, smartphones, gaming devices, and so forth. At least some of these mobile devices may be enlisted to help refine positional calculations for indoor application. Such embodiments may offer at least two advantages over the known art. First, embodiments provide a cost savings by avoiding a need to install additional access points. Second, embodiments provide greater accuracy by being able to treat docked mobile devices as access points for the limited purpose of a ranging process. A ranging process typically includes or performs one or more range determination measurements between device(s) at known or relatively fixed locations (such as a fixed wireless station or a docked mobile device), and a device such as a Wi-Fi enabled device whose position is being sought. A single range determination measurement will have an associated accuracy, and an accuracy of a ranging process may be improved compared to a single range determination measurement by performing ranging process calculations with additional range determination measurements.

FIG. 5 illustrates a process 500 in accordance with an embodiment of the present disclosure. Process 500 begins at block 502, at which a mobile device is placed in a fixed location, such as attached to a relatively immobile docking station.

Next, at block 504, the position of the fixed location is determined. The location may be determined from the infrastructure, e.g., by use of the Wi-Fi network, or may be entered by the user or a system administrator if known. The position of the fixed location may be pre-determined in advance (e.g., when a docking station is installed at an employee's workspace), and the pre-determined location may be stored in a system memory for recall when needed. The accuracy of determining the position of the fixed location should be commensurate with the accuracy with which the position of the Wi-Fi enabled device is being sought. For example, if the position of the Wi-Fi enabled device is desired to be known within two feet, then the position of the fixed location should be known to within around two feet. Such positional accuracy means that a user may move a docking station by small distances, e.g., from one side of a desk to another without needing to update the position of the docking station as recorded in a system embodiment, but if the docking station is moved by larger distances, e.g., across a room then its position in a system embodiment may need to be updated.

The process may include bootstrapping a position determination of endpoints. For example, the position determining process may be used to determine a position of a first wireless station (e.g., a first AP or a first docked mobile device). Then the calculated endpoint position may be used to determine the position of a second wireless station (e.g., a second AP or a second docked mobile device) or of the Wi-Fi enabled device in a recursive manner. However, in order to avoid introducing excessive error, error propagation, or location uncertainty, the process should treat the location accuracy very carefully. For example if the location accuracy of a first wireless station is based on a location accuracy of a second wireless station, and the second wireless station recalculates its position, then the first wireless station may also have to recalculate its position.

Next, at block 506, the docked mobile device retrieves the location of the fixed location that it is being associated with (e.g., the location of its docking station).

Next, at optional block 508, the network status may be updated to include the status of the docked mobile device as being connected to the network at the location of the docking station.

Next, at block 510, the docked mobile device performs the normal operation of a Wi-Fi device, e.g., cooperation in the execution of a discovery procedure.

Next, at block 512, the docked mobile device responds to ranging requests from the Wi-Fi enabled device. The Wi-Fi enabled device has to know the location of docked mobile devices. Locations may be discovered by asking the network, asking the endpoint, and/or obtaining locations from a server.

FIG. 6 illustrates an embodiment of a process 600 that may be used to perform indoor position location. In particular, process 600 may be used as part of block 512 of process 500.

Process 600 begins at block 602, at which a Wi-Fi enabled device recognizes one or more Wi-Fi access points, other fixed wireless stations and/or docked mobile devices that may be associated with one or more Wi-Fi networks. For example, recognition may be by way of receiving one or more beacons transmitted by Wi-Fi access points, other fixed wireless stations and/or docked mobile devices, or by querying the network through an associated AP.

Next, at block 604, the Wi-Fi enabled device performs ranging using at least signals to and from a docked mobile device. The ranging may also include using signals to and from a Wi-Fi access point. Examples of ranging processes may include time of flight, RSSI detection, and so forth. Embodiments are not limited by the ranging process used, and may be adapted to ranging processes developed in the future.

Next, at block 606, the Wi-Fi enabled device receives position information regarding Wi-Fi access points or other fixed wireless stations, and docked mobile devices that the Wi-Fi enabled device has been ranging to. It is assumed that the positions of the docked mobile devices and access points are accurately known a priori, e.g., by completion of block 506. The accuracy should be similar to the desired accuracy of the positional calculation of the Wi-Fi enabled device. If the various docked mobile devices have varying degrees of uncertainty in their position, their contribution to the overall positional accuracy may be weighted by their own positional uncertainty. The calculation would proceed in a manner similar to Bayesian probability calculations. By this process, range to a relatively immobile endpoint whose position is accurately known may be given greater weight than range to a relatively mobile endpoint whose position is less accurately known.

Next, at block 608, the Wi-Fi enabled device performs trilateration using the ranges measured at block 604 and using the position information received at block 606. Other position location processes noted earlier may also be used, such as AoA-aided trilateration, SLAM, RSSI, and so forth.

Ranging to both docked mobile devices and Wi-Fi access points provides a larger number of range determination measurements to the Wi-Fi enabled device than if ranging were performed just to Wi-Fi access points. The larger number of range measurements allows the Wi-Fi enabled device to calculate its position more accurately and thus provide a better user experience. Furthermore, in a typical indoor environment, there may exist cases of outlier measurements, e.g., erroneous measurements due to non-LoS conditions. Having access to additional range determination measurements may allow the Wi-Fi enabled device to identify and ignore inconsistent measurements.

Figure 7A:
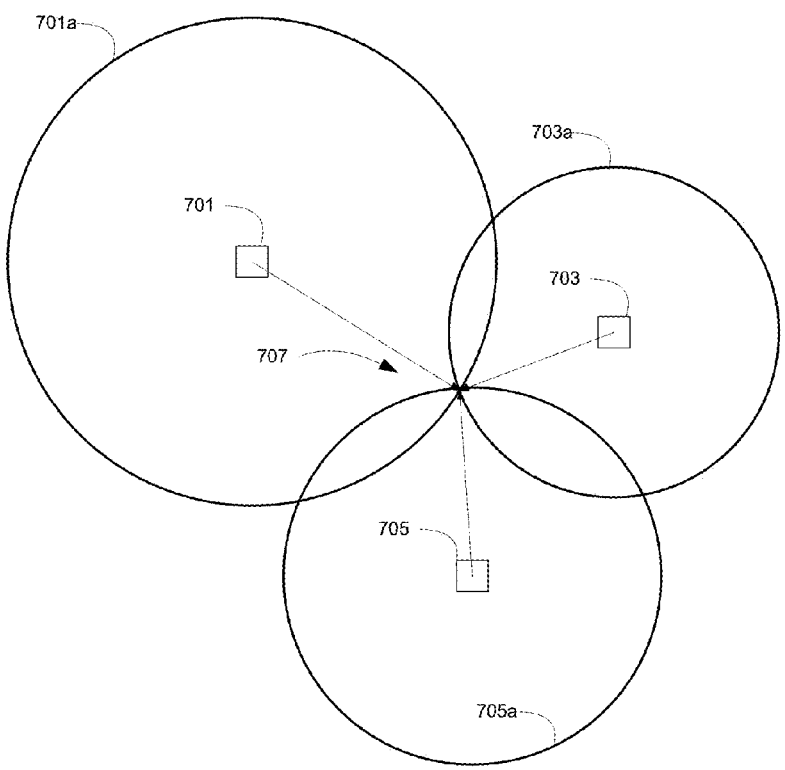
FIGS. 7A-7B illustrate an example of position locating using access points.

FIG. 7A illustrates a position locating scenario 700 that involves only Wi-Fi access points. Scenario 700 includes Wi-Fi access points 701, 703 and 705. A Wi-Fi enabled device has performed a ranging process and a trilateration process involving Wi-Fi points 701, 703 and 705, and has calculated the distances that separate the Wi-Fi enabled device from each of Wi-Fi access points 701, 703 and 705. The calculated distances from each of Wi-Fi access points 701, 703 and 705 is represented as circular ranges 701a, 703a and 705a, respectively. The Wi-Fi enabled device, knowing the positions of each of Wi-Fi access points 701, 703 and 705, and having calculated the ranges 701a, 703a and 705a, is therefore able to determine that it is at the intersection 707 of ranges 701a, 703a and 705a.

However, there is an inherent uncertainty in the positions of Wi-Fi access points 701, 703 and 705 and ranges 701a, 703a and 705a. The uncertainties may arise from measurement tolerances, measurement accuracies, etc. For example, measurement errors associated with ToF for trilateration calculations have been discussed earlier. Therefore, at a sufficiently small positional resolution, the ranges 701a, 703a and 705a do not converge at a single point, but instead converge within a small region. The region may be characterized by statistical measures related to a true point of convergence, such as a spatial probability distribution having a mean (e.g., peak), standard deviation, and so forth. The true point of convergence may be deemed to be located at the peak of the spatial probability distribution.

Figure 7B:
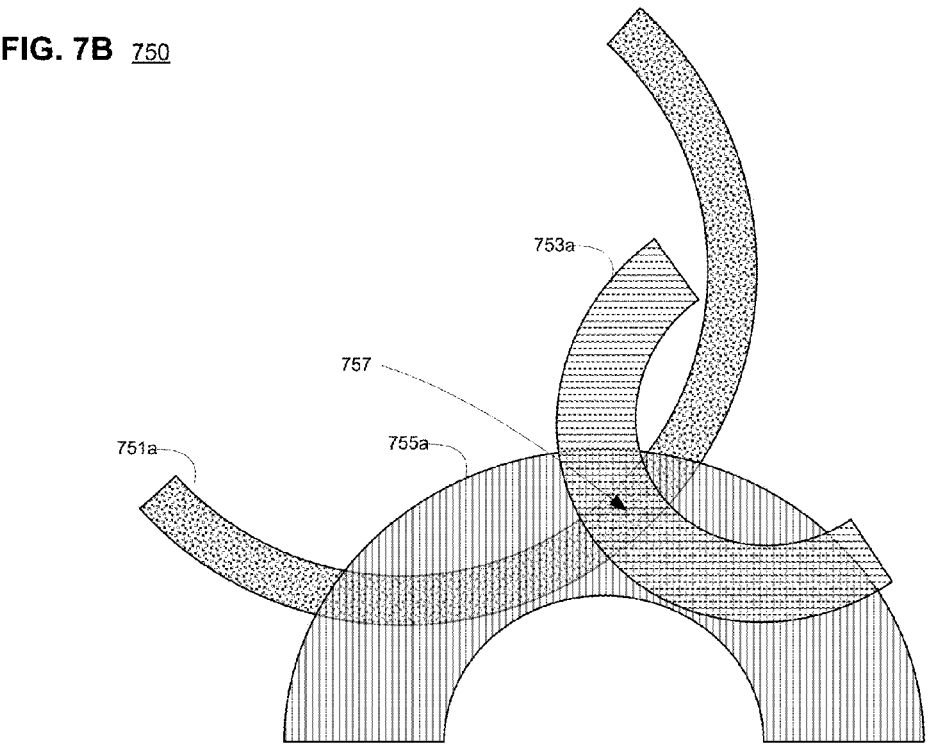

FIG. 7B illustrates an expanded view of the vicinity of intersection 707 illustrated in FIG. 7A. Each of ranges 701a, 703a and 705a are replaced with ranges 751a, 753a and 755a, respectively. Each of ranges 751a, 753a and 755a is illustrated with a non-zero thickness, which represents a mean of the estimated range +/− one standard deviation of the estimated range. Mean +/− one standard deviation of range 751a is represented by a stipple pattern. Mean +/− one standard deviation of range 753a is represented by a horizontal line pattern. Mean +/− one standard deviation of range 755a is represented by a vertical line pattern. The intersection of ranges 751a, 753a and 755a is a small but non-point region 757.

Figure 8:
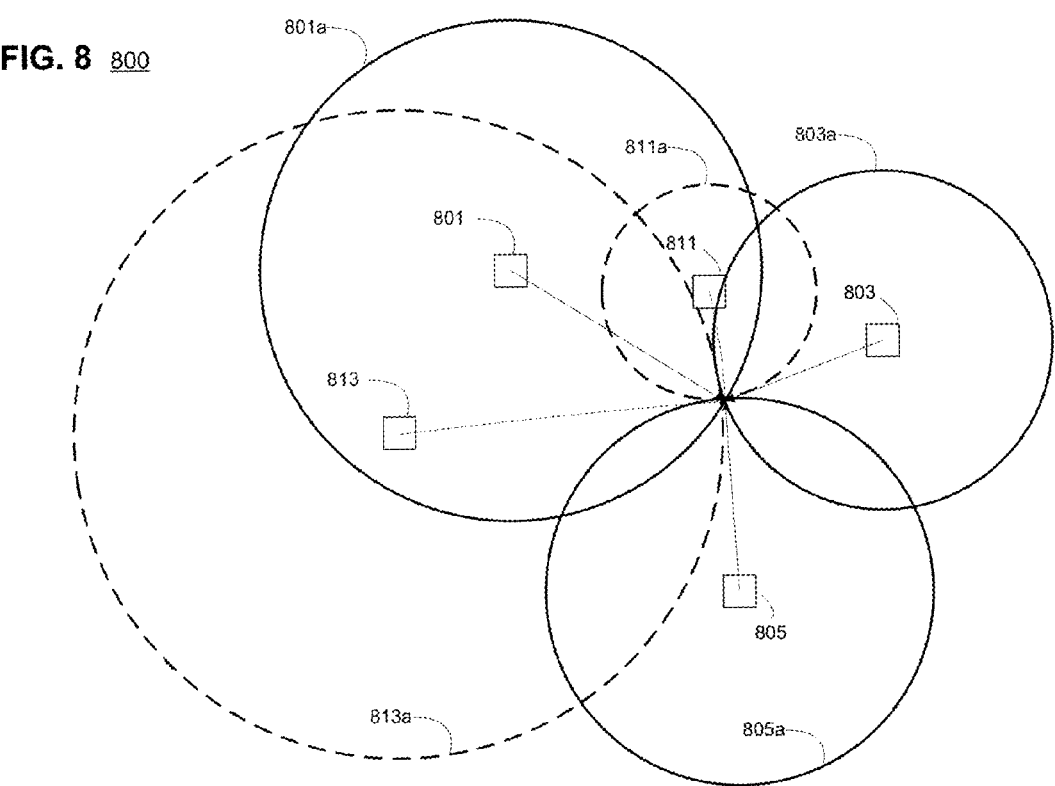
FIG. 8 illustrates an example of position locating using access points and endpoints.

FIG. 8 illustrates a position locating scenario 800 that involves both Wi-Fi access points and docked mobile devices. For sake of clarity, all ranges are depicted in scenario 800 as line circles, but it should be understood that the ranges include a mean and standard deviation of each estimated range, as is depicted in FIG. 7B.

Scenario 800 includes Wi-Fi access points 801, 803, 805 and docked mobile devices 811, 813. A Wi-Fi enabled device has performed a ranging process and a trilateration process involving Wi-Fi access points 801, 803, 805 and docked mobile devices 811, 813, and has calculated the distances that separate the Wi-Fi enabled device from each of Wi-Fi access points 801, 803, 805 and docked mobile devices 811, 813. The calculated distances from each of Wi-Fi access points 801, 803 and 805 is represented as solid circular ranges 801a, 803a and 805a, respectively. The calculated distances from each of docked mobile devices 811, 813 is represented as dashed circular ranges 811a, 813a, respectively. The Wi-Fi enabled device, knowing the positions of each of Wi-Fi access points 801, 803, 805 and docked mobile devices 811, 813, and having calculated the ranges 801a, 803a, 805a, 811a and 813a, is therefore able to determine that it is at the intersection of ranges 801a, 803a, 805a, 811a and 813a.

Although scenario 800 also includes an inherent uncertainty in the positions of Wi-Fi access points 801, 803, 805 and docked mobile devices 811, 813, and ranges 801a, 803a, 805a, 811a and 813a, the combined effect of including more range measurements compared to scenario 700 is that the spatial probability distribution of the true point of convergence of ranges 801a, 803a, 805a, 811a and 813a should have a smaller standard deviation, e.g., the peak of the spatial probability distribution should be known with greater certainty compared to scenario 700, and with greater ability to ignore outlier measurements.

Figure 9:
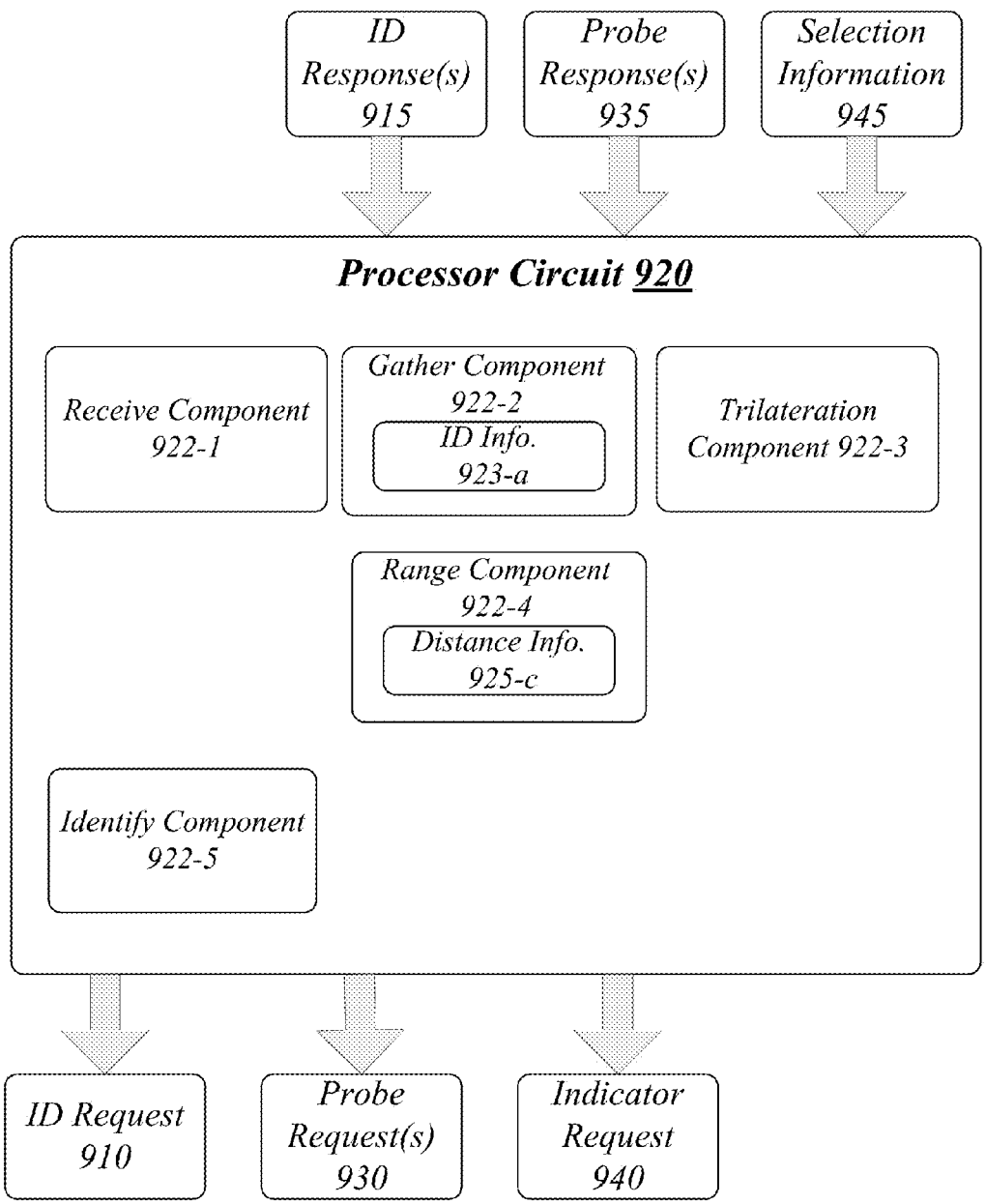
FIG. 9 illustrates an example block diagram for a first apparatus.

FIG. 9 illustrates a block diagram for a first apparatus. As shown in FIG. 9, the first apparatus includes an apparatus 900. Although apparatus 900 shown in FIG. 9 has a limited number of elements in a certain topology or configuration, it may be appreciated that apparatus 900 may include more or less elements in alternate configurations as desired for a given implementation.

The apparatus 900 may comprise a computer and/or firmware implemented apparatus 900 having a processor circuit 920 arranged to execute one or more components 922-a. It is worthy to note that "a" and "b" and "c" and similar designators as used herein are intended to be variables representing any positive integer. Thus, for example, if an implementation sets a value for a=5, then a complete set of components 922-a may include modules 922-1, 922-2, 922-3, 922-4 or 922-5. The embodiments are not limited in this context.

According to some examples, apparatus 900 may be part of a mobile device that may be capable of operating in compliance with one or more wireless technologies such as those described in or associated with the IEEE 802.11 standards. For example, the mobile device having apparatus 900 may be arranged or configured to wirelessly couple to a Wi-Fi access point or another Wi-Fi communication device.

In some examples, as shown in FIG. 9, apparatus 900 includes processor circuit 920. Processor circuit 920 may be generally arranged to execute one or more components 922-a. The processor circuit 920 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Dual microprocessors, multi-core processors, and other multi-processor architectures may also be employed as processor circuit 920. According to some examples processor circuit 920 may also be an application specific integrated circuit (ASIC) and components 922-a may be implemented as hardware elements of the ASIC.

According to some examples, apparatus 900 may include a receive component 922-1. Receive component 922-1 may be executed by processor circuit 920 to receive Wi-Fi probe responses.

In some examples, apparatus 900 may also include a gather component 922-2. Gather component 922-2 may be executed by processor circuit 920 to gather identification information from one or more devices capable of wirelessly communicating with the mobile device. Gather component 922-2 may gather identification information included locations of Wi-Fi access points and/or other Wi-Fi devices and at least temporarily store the gathered identification information with ID info. 923-a. According to some examples, gather component 922-2 may maintain ID info. 923-a in a data structure such as a lookup table (LUT).

In some examples, apparatus 900 may also include a range component 922-4. Range component 922-4 may be executed by processor circuit 920 to determine ranges (e.g., distances) between the mobile device and the one or more devices based on a ranging technique utilizing the Wi-Fi frequency band. For these examples, a ranging technique such as ranging technique 200 may be used to determine the distances. Range component 922-4 may cause probe request(s) 930 to be transmitted to the one or more devices and receive corresponding probe response(s) 935. Information associated with transmitted probe request(s) 930 and received probe response(s) 935 may then be used to determine separate distances between the mobile device and the one or more devices. Range component 922-4 may use identification information from ID Info. 923-a and at least temporarily maintain determined distances with distance info. 925-c. According to some examples, distance info. 925-c may be maintained in a LUT or other type of data structure.

In some examples, apparatus 900 may also include a trilateration component 922-3. Trilateration component 922-3 may be executed by processor circuit 920 to the location of the mobile device based at least in part upon the distances determined by range component 922-4.

According to some examples, apparatus 900 may also include an identify component 922-5. Identify component 922-5 may be executed by processor circuit 920 to identify the given device from among the one or more devices based on the given device having the shortest determined distance.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 10:
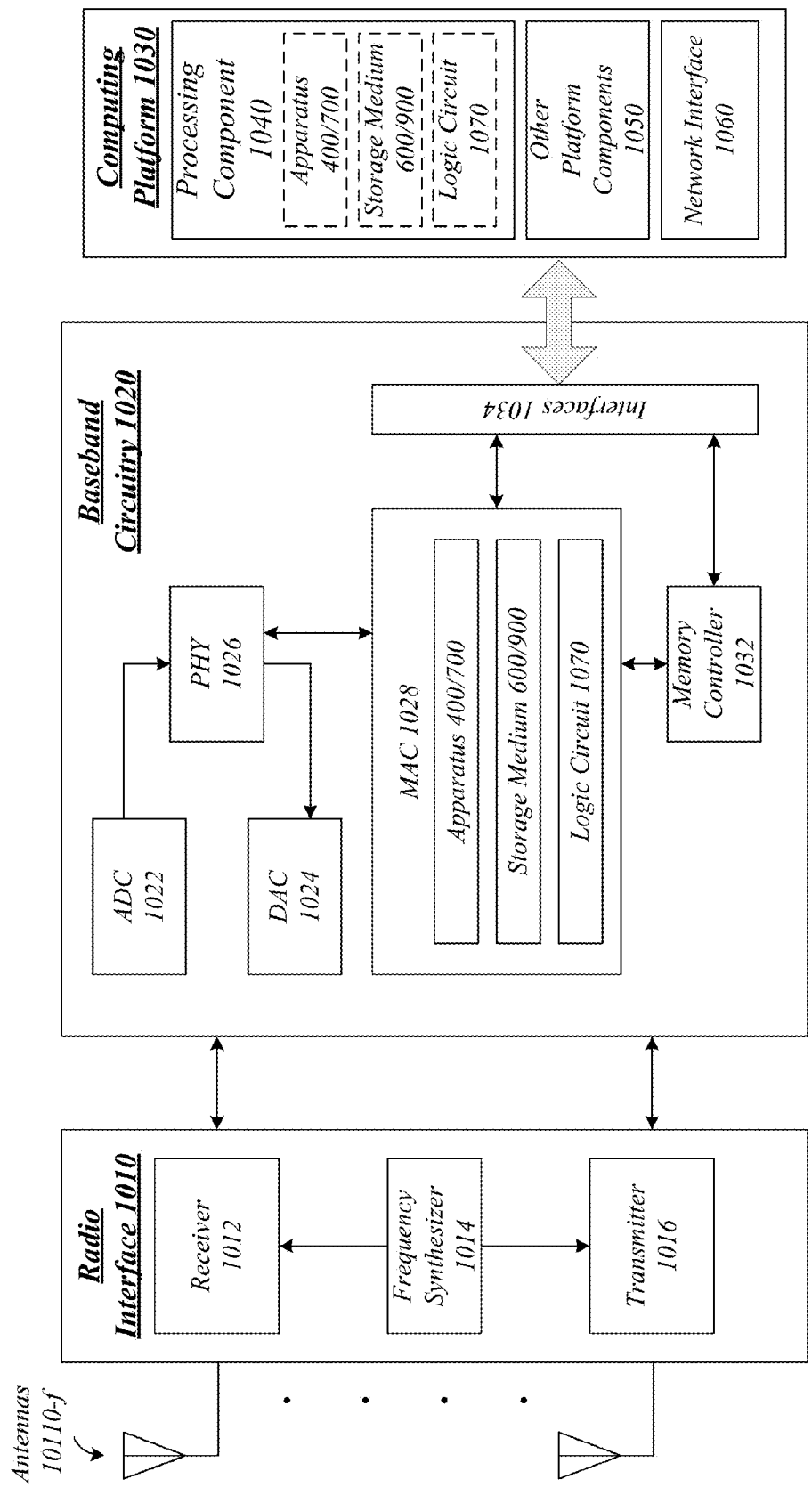
FIG. 10 illustrates an example of a device.

FIG. 10 illustrates an embodiment of a device 1000. In some examples, device 1000 may be configured or arranged for wireless communications in a wireless network. Device 1000 may implement, for example, a Wi-Fi access point, a storage medium and/or a logic circuit 1070. The logic circuit 1070 may include physical circuits to perform operations described for other apparatus. As shown in FIG. 10, device 1000 may include a radio interface 1010, baseband circuitry 1020, and computing platform 1030, although examples are not limited to this configuration.

The device 1000 may implement some or all of the structure and/or operations for apparatus, storage medium 600/900 and/or logic circuit 1070 in a single computing entity, such as entirely within a single device. The embodiments are not limited in this context.

Radio interface 1010 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM symbols) although the embodiments are not limited to any specific over-the-air interface or modulation scheme. Radio interface 1010 may include, for example, a receiver 1012, a transmitter 1016 and/or a frequency synthesizer 1014. Radio interface 1010 may include bias controls, a crystal oscillator and/or one or more antennas 1018-f. In another embodiment, radio interface 1010 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1020 may communicate with radio interface 1010 to process receive and/or transmit signals and may include, for example, an analog-to-digital converter 1022 for down converting received signals, a digital-to-analog converter 1024 for up converting signals for transmission. Further, baseband circuitry 1020 may include a baseband or physical layer (PHY) processing circuit 1026 for PHY link layer processing of respective receive/transmit signals. Baseband circuitry 1020 may include, for example, a processing circuit 1028 for medium access control (MAC)/data link layer processing. Baseband circuitry 1020 may include a memory controller 1032 for communicating with MAC processing circuit 1028 and/or a computing platform 1030, for example, via one or more interfaces 1034.

In some embodiments, PHY processing circuit 1026 may include a frame construction and/or detection module, in combination with additional circuitry such as a buffer memory, to construct and/or deconstruct communication frames (e.g., containing subframes). Alternatively or in addition, MAC processing circuit 1028 may share processing for certain of these functions or perform these processes independent of PHY processing circuit 1026. In some embodiments, MAC and PHY processing may be integrated into a single circuit.

Computing platform 1030 may provide computing functionality for device 1000. As shown, computing platform 1030 may include a processing component 1040. In addition to, or alternatively of, baseband circuitry 1020 of device 1000 may execute processing operations or logic for other apparatus, a storage medium, and logic circuit 1070 using the processing component 1030. Processing component 1040 (and/or PHY 1026 and/or MAC 1028) may comprise various hardware elements, software elements, or a combination of both. Examples of hardware elements may include devices, logic devices, components, processors, microprocessors, circuits, processor circuits (e.g., processor circuit 1020), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 1030 may further include other platform components 1050. Other platform components 1050 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 1030 may further include a network interface 1060. In some examples, network interface 1060 may include logic and/or features to support network interfaces operated in compliance with one or more wireless broadband technologies such as those described in one or more standards associated with IEEE 802.11 such as IEEE 802.11ad.

Device 1000 may be, for example, user equipment, a computer, a personal computer (PC), a desktop computer, a laptop computer, a notebook computer, a netbook computer, a tablet computer, other small computing devices, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of device 1000 described herein, may be included or omitted in various embodiments of device 1000, as suitably desired. In some embodiments, device 1000 may be configured to be compatible with protocols and frequencies associated with IEEE 802.11 Standards for WLANs and/or for wireless docking, although the examples are not limited in this respect.

Embodiments of device 1000 may be implemented using single input single output (SISO) antenna architectures. However, certain implementations may include multiple antennas (e.g., antennas 1018-f) for transmission and/or reception using adaptive antenna techniques for beamforming or spatial division multiple access (SDMA) and/or using multiple input multiple output (MIMO) communication techniques.

The components and features of device 1000 may be implemented using any combination of discrete circuitry, application specific integrated circuits (ASICs), logic gates and/or single chip architectures. Further, the features of device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In some examples, an example apparatus may include a processor circuit for a mobile device. A gather component may also be executed by the processor circuit to gather identification information from one or more devices capable of wirelessly communicating with the mobile device. A range component may also be executed by the processor circuit to determine ranges between the mobile device and the one or more devices based on a ranging process utilizing wireless signals, wherein at least one of the devices comprises a docked mobile device. A trilateration component may also be executed by the processor circuit to calculate or assist a network processor in calculating a location of the mobile device based on the determined ranges to the one or more devices.

According to some examples, the ranging process may also be a time-of-flight process.

According to some examples, the ranging process may also be a channel estimation process to resolve multipath interferences.

According to some examples, the ranging process may also recursively determines a location of a second wireless endpoint based upon a location of a first wireless endpoint determined by the ranging process.

According to some examples, the trilateration component may also be a Bayesian estimation of position calculated from the determined ranges.

According to some examples, the calculated location of the mobile device may have an accuracy of within three feet.

According to some examples, information gathered by the gather component may also be the locations of at least some of the one or more devices.

According to some examples, information gathered by the gather component may also be a docking status of at least some of the one or more devices.

In some examples, an example method may include gathering, by a processor circuit for a mobile device, identification information from one or more devices capable of wirelessly communicating with the mobile device. Ranging, by the processor circuit, may also be performed to determine ranges between the mobile device and the one or more devices based on a ranging process utilizing wireless signals, wherein at least one of the devices comprises a docked mobile device. Calculating, by the processor circuit, a location of the mobile device from the determined ranges by use of a trilateration component may also be performed.

According to some examples of the method, ranging may also include calculating by use of a time-of-flight (ToF) process.

According to some examples of the method, ranging may also include resolving multipath interferences by use of a channel estimation process.

According to some examples of the method, ranging may also include recursively determining a location of a second wireless endpoint based upon a location of a first wireless endpoint determined by ranging.

According to some examples of the method, the trilateration component may also be a Bayesian estimation of position calculated from the determined ranges.

According to some examples of the method, the calculated location of the mobile device may also have an accuracy of within three feet.

According to some examples of the method, information gathered by the gather component may also include the locations of at least some of the one or more devices.

According to some examples of the method, information gathered by the gather component may also include a docking status of at least some of the one or more devices.

In some examples, an example system may include a processor circuit and a memory coupled to the processor. The system may also include a gather component, stored in the memory, to be executed by the processor circuit to gather identification information from one or more devices capable of wirelessly communicating with the mobile device. The system may also include a range component, stored in the memory, to be executed by the processor circuit to determine ranges between the mobile device and the one or more devices based on a ranging process utilizing wireless signals, wherein at least one of the devices comprises a docked mobile device. The system may also include a trilateration component, stored in the memory, to be executed by the processor circuit to calculate a location of the mobile device based on the determined ranges. The system may also include a transceiver coupled to the processor and an antenna coupled to the transceiver and configured to operate at Wi-Fi frequencies;

According to some examples of the system, the ranging process comprises a time-of-flight (ToF) ranging process.

According to some examples of the system, the ranging process comprises a channel estimation process to resolve multipath interferences.

According to some examples of the system, the ranging process recursively determines a location of a second wireless endpoint based upon a location of a first wireless endpoint determined by the ranging process.

According to some examples of the system, the trilateration component comprises a Bayesian estimation of position calculated from the determined ranges.

According to some examples of the system, the location of the mobile device calculated by the trilateration component has an accuracy of within three feet.

According to some examples of the system, identification information gathered by the gather component comprises the locations of at least some of the one or more devices.

According to some examples of the system, information gathered by the gather component comprises a docking status of at least some of the one or more devices.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What is claimed is:

1. An apparatus to locate an indoor position, comprising:
a processor circuit for a mobile device;
a gather component to be executed by the processor circuit to gather identification information and locations from one or more devices capable of wireles sly communicating with the mobile device, and at least one of the locations comprising a fixed location of a docking station, the fixed location received from a device of the one or more devices, and the device communicatively coupled with the docking station;
a range component to be executed by the processor circuit to determine ranges between the mobile device and the one or more devices based on a ranging process utilizing wireless signals, wherein at least one of the one or more devices comprises a docked mobile device coupled to the docking station; and
a trilateration component to be executed by the processor circuit to locate a position of the mobile device in an indoor environment based on the determined ranges to the one or more devices, the locations of the one or more devices, and the fixed location of the docking station received from the device.

2. The apparatus of claim 1, wherein the ranging process comprises a time-of-flight (ToF) ranging process.

3. The apparatus of claim 1, wherein the ranging process comprises a channel estimation process to resolve multipath interferences.

4. The apparatus of claim 1, wherein the ranging process recursively determines a location of a second wireless station based upon a location of a first wireless station determined by the ranging process.

5. The apparatus of claim 1, wherein the trilateration component comprises a Bayesian estimation of position calculated from the determined ranges.

6. The apparatus of claim 1, wherein a calculated location of the mobile device has an accuracy of within three feet.

7. The apparatus of claim 1, wherein information gathered by the gather component comprises a docking status of at least some of the one or more devices.

8. The apparatus of claim 1, wherein the trilateration component is configured to report ranges to a network processor for trilateration calculations.

9. A method to locate an indoor position, comprising:
gathering, by a processor circuit for a mobile device, identification information and locations from one or more devices capable of wireles sly communicating with the mobile device, and at least one of the locations comprising a fixed location of a docking station, the fixed location received from a device of the one or more devices, and the device communicatively coupled with the docking station;
ranging, by the processor circuit, to determine ranges between the mobile device and the one or more devices based on a ranging process utilizing wireless signals, wherein at least one of the devices comprises a docked mobile device coupled to the docking station; and
calculating, by the processor circuit, a location of the mobile device in an indoor environment from the determined ranges, the locations of the one or more devices, and the fixed location of the docking station received from the device.

10. The method of claim 9, wherein ranging comprises calculating by use of a time-of-flight (ToF) process.

11. The method of claim 9, wherein ranging comprises resolving multipath interferences by use of a channel estimation process.

12. The method of claim 9, wherein ranging comprises recursively determining a location of a second docked mobile device based upon a location of a first docked mobile device determined by ranging.

13. The method of claim 9, wherein calculating comprises a trilateration component using a Bayesian estimation of position calculated from the determined ranges.

14. The method of claim 9, wherein a calculated location of the mobile device has an accuracy of within three feet.

15. The method of claim 9, wherein information gathered by the gather component comprises a docking status of at least some of the one or more devices.

16. One or more non-transitory machine readable storage medium comprising a plurality of instructions stored thereon that, in response to being executed, cause a processor circuit to:
gather identification information and locations from one or more devices capable of wirelessly communicating with a mobile device, and at least one of the locations comprising a fixed location of a docking station, the fixed location received from a device of the one or more devices, and the device communicatively coupled with the docking station;
determine ranges between the mobile device and the one or more devices based on a ranging process utilizing wireless signals, wherein at least one of the devices comprises a docked mobile device coupled to the docking station; and
calculate a location of the mobile device based on the determined ranges to the one or more devices, the locations of the one or more devices, and the fixed location of the docking station received from the device.

17. The one or more non-transitory machine readable storage media of claim 16, wherein the ranging process comprises a time-of-flight (ToF) ranging process.

18. The one or more non-transitory machine readable storage media of claim 16, wherein the ranging process comprises a channel estimation process to resolve multipath interferences.

19. The one or more non-transitory machine readable storage media of claim 16, wherein the ranging process recursively determines a location of a second wireless station based upon a location of a first wireless station determined by the ranging process.

20. The one or more non-transitory machine readable storage media of claim 16, wherein calculating includes a trilateration component comprising a Bayesian estimation of position calculated from the determined ranges.

21. The one or more non-transitory machine readable storage media of claim 16, wherein the location of the mobile device calculated by a trilateration component has an accuracy of within three feet.

22. The one or more non-transitory machine readable storage media of claim 16, wherein identification information gathered by a gather component comprises a docking status of at least some of the one or more devices.

* * * * *